Sept. 28, 1965     B. BERMAN ETAL     3,209,227
CONTROLLED RECTIFIER REVERSING MOTOR SPEED SYSTEM
Filed Aug. 28, 1961     2 Sheets-Sheet 1

INVENTORS
BARUCH BERMAN
HUGH J. LENNON
BY
ATTORNEY

United States Patent Office 3,209,227
Patented Sept. 28, 1965

3,209,227
CONTROLLED RECTIFIER REVERSING MOTOR
SPEED SYSTEM
Baruch Berman, Rivervale, and Hugh J. Lennon, Washington Township, N.J., assignors, by mesne assignments, to The New York Air Brake Company, New York, N.Y., a corporation of New Jersey
Filed Aug. 28, 1961, Ser. No. 134,295
2 Claims. (Cl. 318—257)

This invention relates to a variable reversible current and voltage control unit and more particularly to a semiconductor type adjustable speed reversing controller for a direct current motor.

The conventional type speed controls for D.C. motors with their associated reversing drives have proven unsatisfactory in many respects: the armature and field rheostats lose power in the conversion of current to heat in the resistance and give a step function of speed control, the variable reluctance method is expensive and requires a rather elaborate mechanical adjustment, and the Ward-Leonard system is also expensive.

The conventional reversing mechanisms for these variable speed drives are relays and contactors. These contactors besides having mechanical moving parts which are subject to wear and tear, arcing, pitting and welding are also unsatisfactory when vibration is present and when stepless operation is desired. They also present hazards in explosive atmospheres because of sparking and at high speeds of reversal, contact chatter may become objectionable, and the mechanical and electrical inertia of these electromechanical devices introduce an appreciable delay in the speed of response.

The thyratron adjustable speed reversing drive has also not been completely satisfactory mainly due to the long ionization time of thyratrons and their susceptibility to erratic triggering.

With the development of the semiconductor controlled rectifier, a new component became available for application in motor control applications. The semiconductor controlled rectifier is capable of handling large amounts of power in relation to its size and weight and offers a controlled gating action when the anode to cathode terminals are forward biased below the breakover voltage and when there is a firing signal on the control element. When the anode to cathode terminals are reverse biased, or when there is no firing potential on this gate, the controlled rectifier is cut off. The semiconductor controlled rectifier has been controlled heretofore by a reset type magnetic amplifier to provide a linearly variable controller with an economy of components in a motor control system invented by one of the inventors of this application, assigned to the same assignee and described in the co-pending application, Motor Control System, Serial No. 41,678. The present invention is an improvement over the device described in that application in that it provides an inexpensive means of obtaining speed reversal while retaining the advantages of that invention. Although the invention which is the subject of the present application is exceedingly useful for motor control application it may be used in any application which requires a linearly variable reversible current or voltage controller.

It is accordingly an object of this invention to provide an improved variable reversible voltage or current controller for general application.

It is a further object to provide an improved adjustable speed reversing controller for a direct current motor.

It is a still further object to provide a reversing controller that will not spark or chatter in operation.

It is an additional object to provide a reversing controller with smooth and stepless continuous operation from one direction of rotation to the opposite direction of rotation with no dead band around zero speed.

It is a feature of this invention that it can be used with a simple inexpensive resistance network to obtain good speed regulations in any direction of rotation and at all points.

These and additional objects and features are accomplished in the present invention by driving a load from an A.C. source through a rectifying network of two semiconductor controlled rectifiers connected back to back to drive current through the load in opposite directions. Each controlled rectifier is gated by a magnetic amplifier having an output, biasing and control winding. The control windings of the two magnetic amplifiers are connected in series opposition across a bridge. One end of the series connection is connected to the movable arm of the potentiometer or adjustable resistor of the bridge and the movement of the potentiometer arm on either side of the null point determines the direction of current flow through the control windings and causes one magnetic amplifier to provide power and gates its associated controlled rectifier, and the other magnetic amplifier to be cut off and maintain its associated controlled rectifier as an open circuit. Current will then flow through the load in a direction determined by the conducting controlled rectifier.

The following description and drawings will give a fuller appreciation of these and other features of this invention in which.

Figure 1:
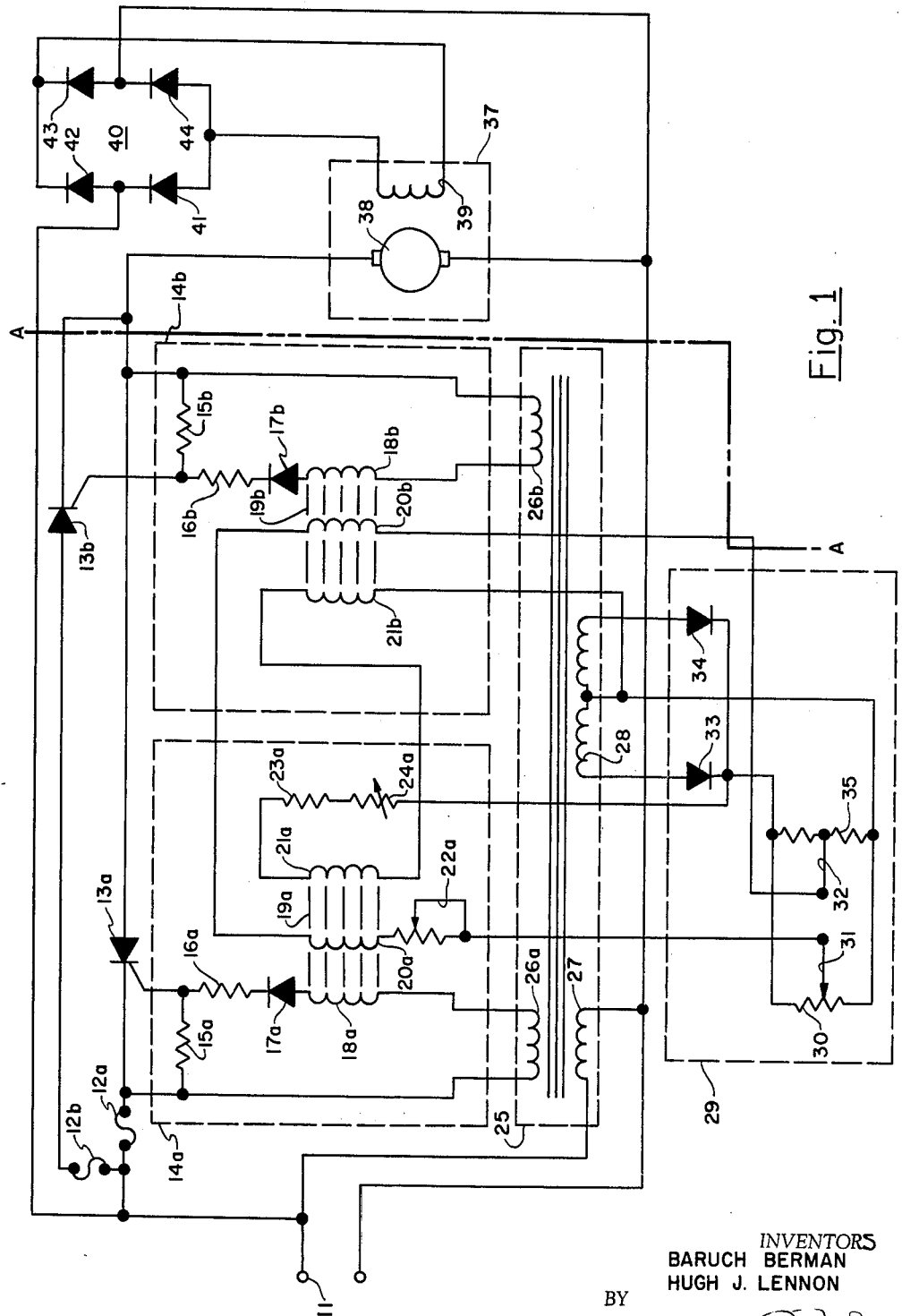
FIG. 1 is a schematic representation of the variable reversible current drive used as a half wave nonregulated adjustable speed reversing drive for a D.C. motor.

FIG. 1 shows a rectifying network of two semiconductor controlled rectifiers 13a and 13b connected back to back in series with an A.C. power source 11 and the armature 38 of a D.C. shunt motor. Throughout FIG. 1 the subscripts "a" and "b" refer to corresponding components which have the same function except that they are associated with opposite directions of current flow through motor armature 38. Fast acting fuses 12a and 12b are inserted in each arm in series with their corresponding controlled rectifier 13a and 13b. The fuses are rated to open the circuit when and if faulty conditions occur which may cause dangerously heavy currents to flow through the controlled rectifier. The controlled rectifiers 13a and 13b are capable of carrying currents which are much heavier than motor rated currents for short durations, thus a fuse affording a wide safety margin may be used.

Controlled rectifiers 13a and 13b are preferably PNPN devices such as the semiconductor silicon controlled rectifier series manufactured by the General Electric Company although any suitable controlled rectifier may be used. They are operated in the present embodiment below the forward anode to cathode breakover voltage and therefore in order to be fired they require triggering by a small positive signal applied from their control electrode to cathode. After breakover, the control electrode loses control and the rectifier is cut off only when the anode to cathode voltage is reduced to zero.

The triggering positive signal to fire controlled rectifiers 13a and 13b is applied between each control electrode and cathode by magnetic amplifiers 14a and 14b respectively. Each magnetic amplifier 14a and 14b has wound around its respective high remanence saturable magnetic core 19a and 19b an output winding 18a and 18b in series with its respective diodes 17a and 17b preferably of the solid state type, current limiting resistors 16a and 16b, voltage output resistors 15a and 15b and the secondary windings 26a and 26b of isolating control transformer 25. Biasing winding 21a also wound around core 19a is connected in series with biasing winding 21b wound around core 19b. One end of 21a and 21b is connected to the center tap of the secondary winding 28 of transformer 25. The other end is connected to diodes 33 and 34 preferably of the solid state type thru variable resistance 24a. Control winding 20a also wound around core 19a is connected in series opposition with control winding 20b wound around core 19b, and variable resistor 22a across the points 31 and 32 of bridge 29. Bridge 29 consists of the two bridge resistance arms 30 and 35 with movable arm 31 movable on either side of the null point of resistance 30 and arm 32 fixed on resistance 35. The bridge is powered through the secondary 28 of transformer 25 but the A.C. is converted to D.C. through diodes 33 and 34 and the return path to the midpoint of secondary winding 28. The primary winding 27 of transformer 25 is connected to the A.C. power source 11. Variable resistor (or rheostat) 22a and variable resistance 24a are shown within the dotted confines of magnetic amplifier 14a but their location is optional as is the location of diodes 33 and 34 shown within the dotted confines of bridge 29.

The load in FIG. 1 is shown as the armature 38 of the D.C. shunt motor 37 which is connected at one to the junction of the anode of controlled rectifier 13a and the cathode of controlled rectifier 13b and connected at the other end to the other side of the power supply 11. The field winding 39 of shunt motor 37 is connected to the D.C. output of rectifying bridge 40 consisting of the four diodes 41, 42, 43 and 44. These diodes are also preferably of the solid state type. A half wave configuration may also be used for a field supply. The A.C. input of rectifying bridge 40 is connected across the power source 11.

When the anode to cathode junction of controlled rectifiers 13a and 13b is forward biased and there is a positive triggering voltage applied from control electrode to cathode, the controlled rectifier will fire. The triggering voltage is maintained positive with respect to whatever power supply half cycle constitutes the forward biasing voltage for the corresponding controlled rectifier by transformer coupling from the power supply.

The output circuit of each magnetic amplifier 14a and 14b operates in the so-called self saturating mode. The half cycle of the applied voltage from power source 11 which forward biases controlled rectifier 13a as transformed through secondary winding 26a applies a voltage in the direction of polarity of diode 17a. This voltage produces flux lines through core 19a towards one direction of saturation of the core. The percentage of saturation increases with time for the duration of that half cycle. The opposite half cycle of the power source forward biases controlled rectifier 13b and as transformed through secondary winding 26b applies a voltage in the direction of polarity of diode 17b that drives core 19b towards its direction of saturation. This half cycle has no effect on the saturation of core 19a because the presence of rectifier 17a prevents magnetization current flow.

The biasing windings 21a and 21b and the control windings 20a and 20b operate in the so-called mmf. mode. Considering the biasing circuit first, the rectified current from secondary winding 28 passes through the biasing windings 21a and 21b so that the flux is in the opposite direction from that produced by the respective output windings 18a and 18b and subtracts from it. Variable resistor 24a is used to set the initial output of the magnetic amplifiers when no control signal is applied to the control windings 20a and 20b. The biasing windings are adjusted in the preferred embodiment so that both controlled rectifiers 13a and 13b are just about to fire at the end of the forward biasing half cycle. This reduces the dead band, or the area in which the motor will not move although an actuating signal is applied. A dead band is undesirable especially in servo and telemetering applications. The motor will remain locked in this position until a signal is applied to the control windings. This may increase the no load standby power somewhat but it will eliminate the dead band.

With movable arm 31 of bridge 29 set at the null point, the potential on arm 31 is the same as the potential on arm 32 and no current flows through the control windings. Movement of the movable arm 31 to either side of the null point will change the direction of current flow through control windings 20a and 20b. Unlike bias windings 21a and 21b, however, the control windings are wound on their respective cores, 19a and 19b in a direction such that current flow upwards from arm 31 through control winding 20a produces flux in the core that reinforces the core flux produced by output winding 18a. Similarly current flow upwards from arm 32 through control winding 20b produces flux in its core 19b that reinforces the core flux produced by output winding 18b. This direction of current as mentioned before is determined by which side of the null point arm 31 is moved to. Assuming arm 31 is moved in a direction to reinforce the effect of output winding 18a, the further away from null that arm 31 is moved, the greater will be the current flow through the control winding 20a and the greater will be the resultant flux in core 19a per unit time period, until that core is driven past the saturation level. At the point in time within the forward biasing half cycle that core 19a reaches saturation, the impedance of output winding 18a decreases and current flows through resistance 15a to make the control electrode of controlled rectifier 13a positive with respect to its cathode, thus causing it to fire until the forward biasing half cycle of power source 11 ends. The more current through the control winding 20a, the earlier in the forward biasing half cycle, controlled rectifier 13a will fire. This current direction, however, subtracts from the direction of saturation of core 19b produced by output winding 18b. Hence controlled rectifier 13b is cut off and current through armature 38 flows from bottom to top with the corresponding direction of motor rotation. Of course, when the arm 31 is moved to the other side of the null point, the current in the control windings reverses direction, and the opposite situation occurs with controlled rectifier 13b firing and the motor 37 rotating in the opposite direction. Variable resistance 22a can be used for minor control current adjustment, or for gain control.

Thus reversible action is accomplished at the operator's will. When the movable arm 31 is flipped over null, a dynamic braking action results as the direction of current flow in the control windings and motor armature changes, and the motor slows down very rapidly. Of course, the bridge 29 may be replaced with a reversible polarity external source or other means of control. The scope of the invention comprehends both variable speed and positioning drives.

It should be noted that in the circuit of FIG. 1, each controlled rectifier is forward biased and triggered by an alternate half cycle, although the biasing windings 21a and 21b as well as the control windings 20a and 20b are actuated by both half cycles. This in effect makes the circuit of FIG. 1 a half wave variable speed reversing drive.

The circuit of FIG. 1 can be modified for full wave operation by the addition of two more controlled rectifier-magnetic amplifier combinations, and two additional secondaries of the transformer. As previously stated in the circuit of FIG. 1, firing occurs only during one half cycle of the applied voltage. For full wave operation, the polarities would be arranged so that a controlled rectifier will conduct in each half cycle.

Figure 2:
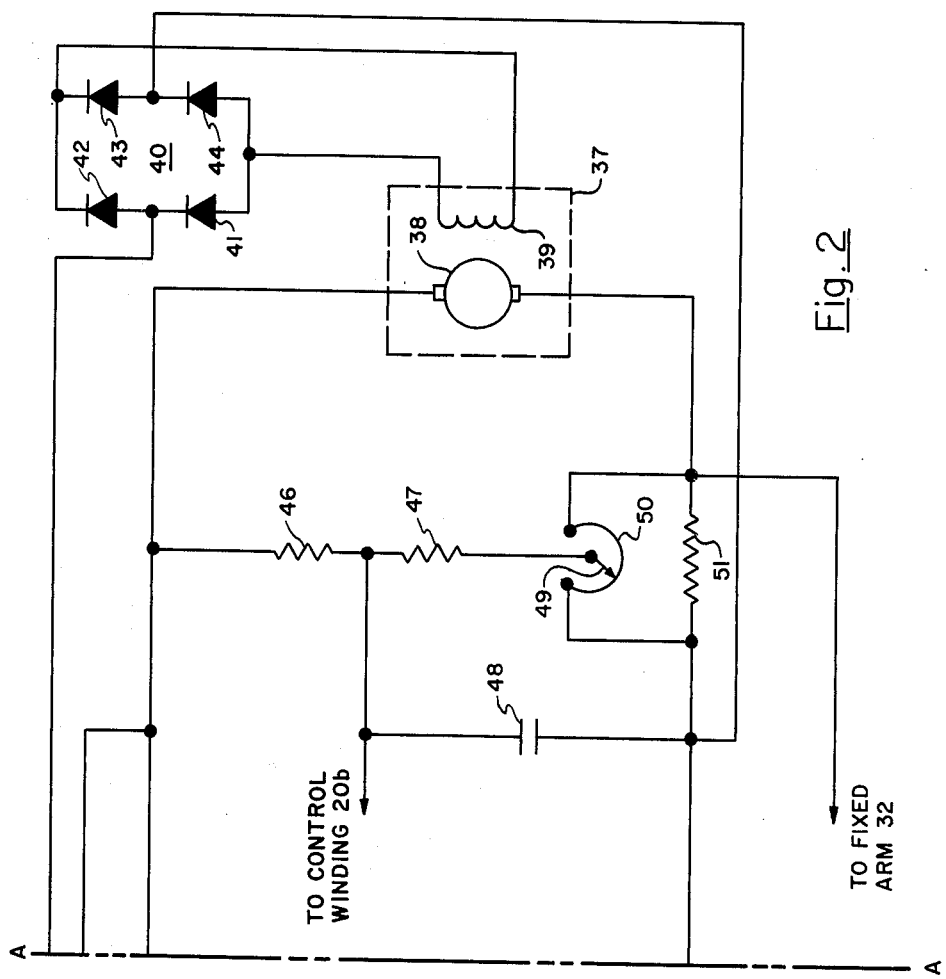
FIG. 2 is a schematic representation of another embodiment in which a portion of the circuit of FIG. 1 is replaced by a half wave regulated adjustable speed reversing drive.

A speed regulating feature can be added to the unregulated reversing drive of FIG. 1 by substituting the circuitry of FIG. 2 for the circuitry on the right hand side of cutting plane line A—A of FIG. 1.

The voltage applied to the armature ($E_s$) may be represented by the following equations:

$$E_s = E.M.F. + IR_a$$

where $I$ = motor armature current; and
$R_a$ = motor armature resistance

The counted E.M.F. of a D.C. shunt motor is represented by the equation $$E.M.F. = \frac{N \times Z \times \phi}{60} \times 10^{-8} \text{ (volts)}$$

where $Z$ = total number of active conductors per path
$\phi$ = the air gap flux cut by the armature conductors; and
$N$ = revolutions per minute of the armature Substituting the second equation in the first equation the motor speed $$N = \frac{60(E_s - IR_a)}{Z\phi} \times 10^{-8} \text{ (r.p.m.)}$$

If $\phi$ is relatively constant, and $IR_a$ is relatively small then the speed is approximately proportional to the voltage ($E_s$) appearing across the motor armature. If the losses in the motor armature are considered then:

$$N = K(E_s - IR_a)$$

where K is a constant.

In FIG. 2, resistors 46 and 47 plus the effective value of the resistance between the movable arm 49 and the right hand side of rheostat 50 are placed across the armature 38 of shunt motor 37. The voltage drop across this combination will be equal to $E_s$. A portion of this taken from the junction of resistors 46 and 47 and applied to control winding 20b will give a signal proportional to $E_s$.

The armature current flowing through rheostat 50 and resistance 51 produces a voltage drop proportional to $IR_a$ in opposition to the voltage rise across resistor 47. Hence the signal applied to control winding 20b is proportional to $E_s - IR_a$.

Capacitor 48 shunts the A.C. ripple component present in the armature voltage to keep the feedback loop stable. The loop is closed by connecting the junction of armature 38 and resistance 51 to fixed arm 32 of bridge 29.

When the movable arm 31 of bridge 29 is moved to one side of the null point, in a direction to re-inforce the effect of output winding 18a, it raises the potential above that of the arm 32 and sends current through control windings 20a and 20b in a direction which causes motor 37 to speed up in one direction of rotation agreeing with the setting of arm 31. As the motor speeds up, the voltage taken from resistor 47 and which is proportional to the speed, and applied to control windings 20b and 20a likewise builds up and tends to buck the driving bridge voltage until an equilibrium condition is reached. If now some transient condition causes the motor to speed up faster than the setting called for by the position of arm 31, the bucking voltage will increase which will increase the effect of control winding 20b and decrease the effect of control winding 20a, thus minimizing the effect of output winding 18a, and slowing the motor down. Similarly should the motor slow down beyond the setting of movable arm 31, the feedback voltage from resistor 47 will decrease, the bucking voltage will decrease which will decrease the effect of control winding 20b and increase the effect of control winding 20a to speed the motor up to the equilibrium point again.

This network will improve speed regulation without resort to the use of a tachometer. Of course, if highly precise regulation is desired, a tachometer may be mounted on the motor shaft or on the controlled work shaft.

It should be understood that a preferred embodiment of the present invention has been described using specific terms and examples but using them in a generic and descriptive sense and not for purposes of limitation, as the scope of the invention is set forth in the following claims.

We claim:

1. A variable speed reversing motor system comprising: a direct current shunt motor having an armature and a field; input terminals for making connections to an alternating current source of electrical power; a first rectifying network connected between said input terminals and said armature for supplying unidirectional current to said armature, said first rectifying network comprising two semiconductor controlled rectifiers connected to conduct current in opposite directions, each controlled rectifier having a cathode and a control electrode for controlling the conduction of said controlled rectifier in response to a signal on its control electrode; a transformer; a pair of magnetic amplifiers, each magnetic amplifier including a control winding and an output circuit having in series an output winding, a resistor, a secondary winding of said transformer and a diode rectifier, said resistor being connected between the cathode and the control electrode of one of the controlled rectifiers; a control circuit including the control windings of said magnetic amplifiers and means connected in series with said control windings for producing an adjustable and reversible unidirectional current in said control windings for variably controlling the output of one magnetic amplifier while holding the other magnetic amplifier at cut-off, to render one or the other controlled rectifier conductive and thereby determine the direction of motor rotation; means for connecting said transformer to the input terminals; second rectifying means connected to the input terminals for supplying unidirectional current to the motor field, armature voltage sensing means connected in parallel with said motor armature; armature current sensing means connected in series with said motor armature and arranged so that the two sensing means produce opposing voltages giving a resultant voltage proportional to the speed of said motor; means for introducing a portion of said resultant voltage into said control circuit to regulate the conduction of said controlled rectifiers in accordance with the speed of the motor; and means for shunting the ripple component of the armature voltage from said resultant voltage.

2. A variable speed reversing motor system comprising: a direct current shunt motor having an armature and a field; input terminals for making connections to a source of electrical power; a first rectifying network connected between said input terminals and said motor armature for supplying direct current to said armature, said first rectifying network including semiconductor controlled rectifiers each having a control electrode and connected to conduct current in opposite directions through the armature in response to a signal on its control electrode; a null bridge for varying the direction and amount of current on either side of the null point; a first and second magnetic amplifier, each having an output circuit coupled to a control electrode of one controlled rectifier and a control circuit responsive to the direction and amount of current from said null bridge for controlling the absence or the presence and amount of a signal from the output circuit, each of said control circuits being connected serially to the other so that one direction of current flow therethrough will tend to increase the signal from the output circuit of the first magnetic amplifier and decrease the signal from the output circuit of the second magnetic amplifier and the other direction of current flow therethrough will tend to decrease the signal from the output circuit of the first magnetic amplifier and increase the signal from the output circuit of the second magnetic amplifier; means for coupling the output circuit of each magnetic amplifier to the input terminals; second rectifying means connected between the input terminals and the motor field for supplying unidirectional current to the field, and impedance means connected in series with said control circuits and said null bridge for deriving a first voltage proportional to the voltage across the armature and deriving a second voltage proportional to the armature current and combining said first and second voltage subtractively, whereby said magnetic amplifiers are controlled so as to stabilize the speed of the motor.

References Cited by the Examiner

UNITED STATES PATENTS

| | | | |
|---|---|---|---|
| 2,558,086 | 6/51 | Herchenroeder | 318—331 X |
| 2,802,169 | 8/57 | Malick | 323—89 |
| 2,864,989 | 12/58 | Bradburn | 318—332 |
| 2,920,240 | 1/60 | Macklem. | |
| 2,998,547 | 8/61 | Berman. | |
| 3,024,401 | 3/62 | Dinger | 318—331 X |
| 3,064,174 | 11/62 | Dinger | 318—331 |

OTHER REFERENCES

Controlled Rectifiers Drive A.C. and D.C. Motors, by W. R. Seegmiller, No. 13, 1959, Electronics.

ORIS L. RADER, *Primary Examiner.*

MILTON O. HIRSHFIELD, *Examiner.*